March 31, 1970 H. MICHAELIS 3,504,355
REVERSIBLE TRANSFLUXOR RING COUNTER
Filed Jan. 20, 1966
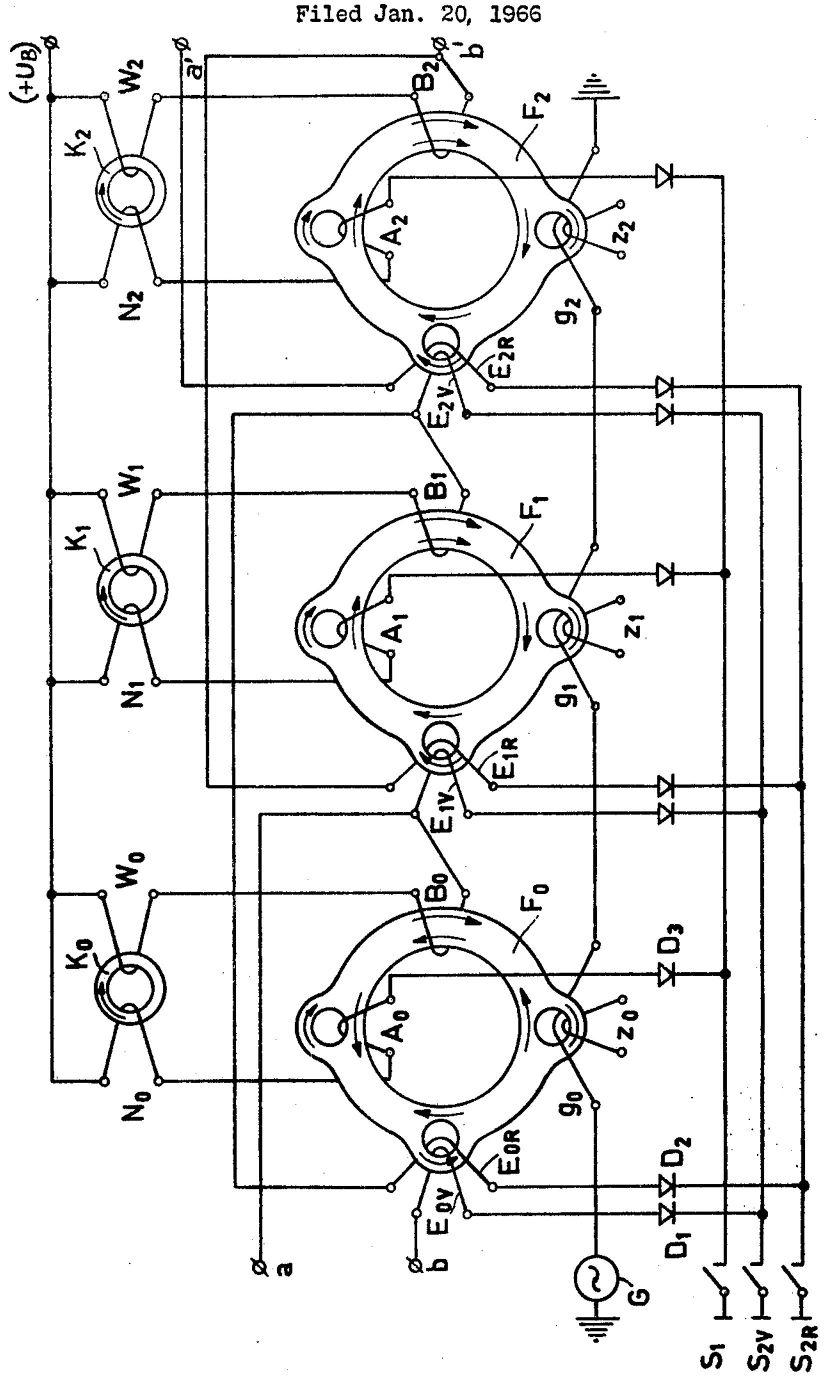
INVENTOR.
HORST MICHAELIS
BY
Frank R. Trifari
AGENT

United States Patent Office 3,504,355
Patented Mar. 31, 1970

3,504,355

REVERSIBLE TRANSFLUXOR RING COUNTER

Horst Michaelis, Quickborn, Germany, assignor, by mesne assignments, to U.S. Philips Corporation, New York, N.Y., a corporation of Delaware Filed Jan. 20, 1966, Ser. No. 521,930
Claims priority, application Germany, Jan. 21, 1965, P 35,914
Int. Cl. G11b *5/00*
U.S. Cl. 340—174 6 Claims

ABSTRACT OF THE DISCLOSURE

A series of transfluxors arranged as a ring counter and including an auxiliary ring core for each transfluxor. A first switch sets the ring core associated with the transfluxor storing information and a second set of switches transfer the digit from the storage transfluxor, and simultaneously erase the digit originally stored in the storage transfluxor.

The invention relates to a reversible ring counter employing transfluxors and ring cores having a rectangular hysteresis loop as an intermediate memory.

Reversible counters are often used in the control technology to compare the given value of the quantity with the prescribed value of that quantity.

It is known that a slide register with two cores per bit can be operated in the both directions when a coupling circuit is provided each time for each slide direction. The windings are connected through two diodes and provided with center taps so that, as is the case with a ring modulator, the diodes are opened by a control current and thus transmission of information from memory core to memory core is possible in the chosen direction. If such a reversible slide register with transfluxors as the main memory and simple ring cores and the intermediate memories is to be used for the sake of a permanent indication, ten transfluxors and ten ring cores each having ten windings are required for one counting decade, not counting the reading windings and the preparation windings. In addition, eighty diodes are required. Since the winding costs are comparatively high, a counting decade manufactured according to this method is expensive. In addition it should be taken into account that the reliability decreases when the number of soldering points increases.

In addition a transfluxor slide register is known which comprises no diodes and fewer windings, it is true, but which, with two transfluxors by bit, requires a four-phase system which reduces the maximum counting frequency and increases the electronic equipment for the control.

In principle, the problem in carrying out a counting process is that first the adjusted (marked) memory is identified and that then—in the case of forward counting—the magnetic memory succeeding in the series and—the case of backward counting—the magnetic memory preceding in the series respectively must be adjusted and simultaneously, or afterwards, the identified memory must be restored (erased) to its original condition.

According to the invention, the above problems in carrying out a counting process with transfluxors as readable main memories and ring cores with rectangular hysteresis loops as short-lasting intermediate memories are solved in that in a two-phase system in the first phase the ring core coupled and associated with the said transfluxor is marked through the adjusted transfluxor associated with an identified digit. In the second phase, through the marked ring core, the transfluxor succeeding in the series—in the case of forward counting—and the transfluxor preceding it—in the case of backward counting—respectively is adjusted and simultaneously the original transfluxor is blocked (erased).

As a result of this a permanent indication is possible and the contents of the counter are maintained after an interruption of the operating voltage.

The tranfluxor used in the reversible register comprise, in addition to the central large aperture, a small aperture for the adjustment and two somewhat larger apertures for the continuous reading for the digit indication and for reading during the first phase of the counting process.

Marking or writing, as it is more commonly termed, the memory core associated with the adjusted transfluxor is effected in that during the time of the first phase or time sequence ($T_1$) a voltage is set up in parallel at the reading windings of the transfluxors. The reading windings are each connected in series with a winding of the associated memory core in such manner that the remaining memory cores are magnetized from the state "zero" to the state "one" while the memory core associated with the adjusted transfluxor remains in the state "zero." The applied voltage and that of the voltages at the reading windings of the transfluxors are of a polarity such that this results in a magnetization of the transfluxors in the cut-off direction, as a result of which the reading windings of the cut-off transfluxors constitute no resistance due to their saturation and the magnetization of the associated intermediate memories can immediately be reversed. In the adjusted transfluxor however, a reversal of the magnetization takes place around the aperture for reading by a threshold current which is smaller than the current which is required for reversing the magnetization of the intermediate memory so that the intermediate memory in question remains in the state "zero."

In the next time sequence or second phase ($T_2$) the core memories which are magnetized to the state "one" are re-magnetized to the state "zero." The windings for the re-magnetization of the core memories are each connected in series with a blocking winding of the associated transfluxor and further connected in parallel with the adjusting windings of the preceding transfluxors succeeding in the counting circuit, thus, each transfluxor has two adjusting windings in accordance with the two directions of counting. Every beginning of a winding for the re-magnetization is in each case connected to one end of a winding for adjusting the forward counting and to one end of a winding for the backward counting. When in the second sequence phase ($T_2$), a voltage is set up at the first winding and at a line which connects the two other windings together, the nine memory cores are re-magnetized from the state "one" to the state "zero" in which the threshold currents have to be so small that the transfluxors cannot adjust. That memory core which was not magnetized to the state "one" in the first phase ($T_1$) is located in one branch. In the second phase ($T_2$) said core constitutes no resistance so that the current can increase to that value as such which is required for cutting off and adjusting the transfluxors. At the end of the phase $T_2$ all the intermediate memories are again in the state "zero," the adjusted transfluxor was cut off and the succeeding respectively preceding transfluxor was adjusted so that the counting process is executed. In this case the core memories of the said reversible counter operate as switches which are first closed, then all but one opened at the instant ($T_1$) and all closed again at the instant $T_2$.

The drawing shows an embodiment of the diagram of the windings of the first three stages of a decimal counter. When the terminals *a* and *b* are connected to *a'* and *b'*, a reversible ring counter of three stages is formed. The transfluxors F0 to F2 comprise, in addition to the windings shown in the FIGURE (a reading winding A, a cut-off winding B, forward and backward adjusting windings E*v* and E*r*, a reading winding *g* for the generator and a lecimal indication winding Z), separate adjusting windıgs and cut-off windings (not shown) for the previous djustment of the counter. In addition, the intermediate ıemory cores K0 to K2 with the windings N and W are ırovided. In order that no undesired secondary load curents occur as a result of the transformed voltage during he two phases, each stage is each time provided with hree diodes D1 to D3.

A counting process will once more be described in detail ıelow with reference to the diagram. In the beginning he transfluxor F0 is adjusted and the transfluxors F1 and '2 are cut-off (the arrows indicating the clock-wise diections of the flux). All the intermediate memory cores ( are in the state "zero" (arrows indicating the flux :lockwise).

During the first phase $T_1$ the switch $S_1$ is closed. The ıattery voltage (+UB) is each time set up at the series) ırrangement of the windings N and A, so that the magıetization of the cores K1 and K2 is reversed, but not the nagnetization of the core K0, since for reversing the magıetization of the upper aperture of the transfluxor F0 a maller current is required than for reversing the magıetization of the core K0. During the subsequent second ›hase T2 the switch S2*v*—in the case of forward countng—and the switch S2*r*—in the case of backward countng—respectively are closed. The cores K1 and K2 are renagnetized to "zero" with currents which are small so :hat the adjustment of the transfluxors F2 and F0 and F1 ınd F0 respectively is prevented. Because the core K0 is ;till in the "zero" state, the voltage (+UB) is applied to he adjusting windings E1*v* and E2*r* respectively and in series therewith to the cut-off winding B0 so that the trans-luxor F0 is cut-off and F1 and F2 respectively are adusted so that a forward counting process and backward counting process respectively has been effected.

What is claimed is:

1. A ring counter as claimed in claim 4 further including a generator and a reading winding coupling the generator with each transfluxor in a series connection, and a separate indication winding provided through the aperture including the reading winding of the generator.

2. A ring counter as claimed in claim 5 wherein said forward and backward windings of each transfluxor are connected to said second and third means by diodes.

3. A ring counter as claimed in claim 6 wherein the reading windings of the transfluxors connected to said first means through diodes.

4. A reversible ring counter comprising a plurality of multiaperture transfluxors sequentially interconnected with means for connecting the last of said transfluxors to the first of said transfluxors at least one of said transfluxors having a digit stored therein and each of said transfluxors having a ring core associated therewith, each of said cores including a first winding coupled to an aperture of an associated transfluxor and a second winding coupled to an aperture of said associated transfluxor and to both a preceding and succeeding transfluxor, first means coupled to said first winding for marking the ring core associated with a digit storing transfluxor, second means coupled to said second winding and responsive to the condition of said marked core for transferring said digit from said digit storing transfluxor to a succeeding transfluxor and erasing said digit storing transfluxor, and third means coupled to said second winding and responsive to the condition of said marked core for transferring said digit from said digit storing transfluxor to a preceding transfluxor and erasing the stored condition of said digit storing transfluxor.

5. A ring counter as claimed in claim 4 wherein each transfluxor include one larger aperture and three smaller apertures and said second winding includes both a forward and a backward winding which together are coupled to each core through one of said smaller apertures, the forward adjusting winding being connected to said preceding core through the larger aperture and to the backward adjusting winding of the preceding transfluxor.

6. A ring counter as claimed in claim 4 wherein said first winding includes a reading winding associated with each transfluxor and connected to the associated ring core through a small aperture of said transfluxor.

References Cited

UNITED STATES PATENTS

| | | | |
|---|---|---|---|
| 3,290,665 | 12/1966 | English | 340—174 |
| 3,243,775 | 3/1966 | English | 340—174 |

FOREIGN PATENTS 1,168,486 4/1964 Germany.

BERNARD KONICK, Examiner

K. E. KROSIN, Assistant Examiner

U.S. Cl. X.R.

340—174